United States Patent
Park et al.

(10) Patent No.: US 11,390,172 B2
(45) Date of Patent: Jul. 19, 2022

(54) VEHICLE HAVING ELECTRIC MOTOR AND DRIVING CONTROL METHOD FOR THE SAME

(71) Applicants: HYUNDAI MOTOR COMPANY, Seoul (KR); KIA MOTORS CORPORATION, Seoul (KR)

(72) Inventors: Joon Young Park, Seoul (KR); Jea Mun Lee, Seoul (KR); Ji Hoon Kang, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 572 days.

(21) Appl. No.: 16/540,693

(22) Filed: Aug. 14, 2019

(65) Prior Publication Data
US 2020/0156480 A1    May 21, 2020

(30) Foreign Application Priority Data
Nov. 20, 2018  (KR) .................. 10-2018-0143415

(51) Int. Cl.
*B60W 30/18*  (2012.01)
*B60L 15/20*  (2006.01)
*H02P 23/00*  (2016.01)
*G05B 19/042*  (2006.01)

(52) U.S. Cl.
CPC ............ *B60L 15/20* (2013.01); *G05B 19/042* (2013.01); *H02P 23/0009* (2013.01); *B60L 2240/12* (2013.01); *B60L 2240/423* (2013.01); *G05B 2219/25368* (2013.01)

(58) Field of Classification Search
CPC .............. B60W 30/18072; B60L 15/20; G05B 19/042; G05B 2219/25368; H02P 23/0009
See application file for complete search history.

(56) References Cited

U.S. PATENT DOCUMENTS

2016/0121898 A1* 5/2016 Jo .................... B60W 30/18072
                                                                180/65.21
2017/0259696 A1* 9/2017 Herzhauser ........... B60W 50/14

* cited by examiner

*Primary Examiner* — Cortez M Cook
(74) *Attorney, Agent, or Firm* — Morgan, Lewis & Bockius LLP

(57) ABSTRACT

A method of controlling a coasting torque using an electric motor for a vehicle having the electric motor includes: determining a speed range to travel on a forward slope based on the current vehicle speed; determining a target speed within the speed range based on the coasting torque and a travel load depending on vehicle speed; and correcting a driving force of the electric motor in response to the determined target speed.

19 Claims, 13 Drawing Sheets

-PRIOR ART-

-PRIOR ART-

-PRIOR ART-

-PRIOR ART-

VEHICLE HAVING ELECTRIC MOTOR AND DRIVING CONTROL METHOD FOR THE SAME

This application claims the benefit of Korean Patent Application No. 10-2018-0143415, filed on Nov. 20, 2018 in the Korean Intellectual Property Office, which is hereby incorporated by reference as if fully set forth herein.

TECHNICAL FIELD

The present disclosure relates to a vehicle having an electric motor and a driving control method for the same, and more particularly, to a method of changing coasting torque depending on an inclination of a slope and a vehicle for executing the same.

BACKGROUND

Coasting refers to a state in which a vehicle is driven by inertial energy without outputting driving power. In general, a coasting event is defined as the time during which neither an accelerator pedal (APS) nor a brake pedal (BPS) is depressed.

The torque applied to the driving shaft during coasting may be referred to as coasting torque. In a general internal combustion engine vehicle, even when neither the accelerator pedal nor the brake pedal is depressed, idle torque of the engine is transmitted to the driving shaft by the torque converter and the transmission. This is referred to as creep torque.

During coasting, while the creep torque is transmitted from the engine to the driving shaft, the travel load caused by the vehicle speed acts in the direction opposite the direction in which the creep torque is transmitted. The coasting torque is determined by the sum of the travel load and the creep torque. This will be described below with reference to FIG. 1.

FIG. 1 is a view showing an example of a relationship between a coasting torque and a vehicle speed while a general vehicle is coasting.

Referring to FIG. 1, when the vehicle speed is low, the transmission generally forms a low gear stage. When the speed of the input shaft of the transmission is lower than the idle RPM of the engine, the idle torque of the engine is transmitted to the driving shaft. Thus, the vehicle is driven forwards by the creep torque. On the other hand, when the vehicle speed is high, the transmission takes a relatively high gear stage. When the speed of the input shaft of the transmission becomes higher than the idle RPM of the engine, drag caused by cutting fuel to the engine is transmitted to the driving shaft, and thus coasting torque is generated.

Recently, with increased demand for environmentally friendly vehicles, hybrid electric vehicles (HEVs) and electric vehicles (EVs), which use an electric motor as a driving source, have been actively developed.

Because a vehicle equipped with an electric motor has no engine or because the engine thereof is not always running, creep torque is not generated by the engine. However, in order to realize the characteristics of a general internal combustion engine vehicle, a vehicle equipped with an electric motor is generally controlled such that the electric motor is driven to generate creep torque. Thus, similar to the phenomenon shown in FIG. 1, in the vehicle equipped with an electric motor, torque in the forward direction, which is caused by the idle RPM of an internal combustion engine and the torque multiplication operation of a torque converter, is simulated in a low-speed state, and torque in the reverse direction, which is caused by the drag formed by cutting fuel to the engine, is simulated in a high-speed state. The region in which the torque in the forward direction is simulated may be referred to as a creep region, and the region in which the torque in the reverse direction is simulated may be referred to as a coasting region.

Further, in the vehicle equipped with an electric motor, response characteristics with respect to the APS are generally adjusted in order to enhance drivability. This will be described below with reference to FIG. 2. FIG. 2 is a view showing the relationship between the accelerator pedal and torque in a general vehicle equipped with an electric motor.

Referring to FIG. 2, in the region in which the value of the accelerator pedal sensor (APS) is low (e.g. 2 to 3%), the responsiveness to the APS is set to be insensitive in order to prevent unintended acceleration. Thus, in the coasting region, even when the APS value increases, the torque in the reverse direction is maintained before the APS value reaches a predetermined value. When the APS value reaches the predetermined value or greater, the torque increases in proportion to the APS value. This adjustment of the APS response characteristics may contribute to the enhancement of drivability in a normal driving state, but may make it difficult for a driver to drive at a constant speed depending on the inclination of a road. This will be described below with reference to FIG. 3.

FIG. 3 is a view showing the effects according to general adjustment of responsiveness to the accelerator pedal depending on the inclination of a road.

The output torque characteristics of an electric motor depending on each APS % and the travel load characteristics depending on the inclination of a road are shown in FIG. 3. The point where the torque curve depending on the APS % and the travel load curve meet is a torque equilibrium point, and equilibrium is maintained at a vehicle speed corresponding to this point. Thus, when the driver target speed is higher than the equilibrium point, operation of the accelerator pedal is required, and when the driver target speed is lower than the equilibrium point, operation of the brake pedal is required.

While the vehicle is traveling on an uphill road or a flat road, the driver target speed is easily achieved by adjusting the APS. For example, during uphill travel, if the APS value is adjusted to 10% to 15%, the torque curve depending on the APS % and the travel load curve meet at the driver target speed.

However, on a gentle downhill road, the torque curve depending on the APS % and the travel load curve meet at the driver target speed when the APS value is adjusted to 3%. Thus, if the input of the APS value of 2 to 3% is not reflected in the driving of the vehicle, as shown in FIG. 2, it becomes difficult to adjust the target speed.

Further, on a steep downhill road, even when the APS value is 0, the equilibrium point is higher than the target speed. Thus, in order to drive the vehicle at a constant speed, the driver needs to continuously depress the brake pedal.

SUMMARY

The present disclosure is directed to a vehicle having an electric motor and a driving control method for the same that substantially obviate one or more problems due to the limitations and disadvantages of the related art.

An object of the present disclosure is to provide a method of more efficiently setting coasting torque and a vehicle for executing the same.

Another object of the present disclosure is to provide a method of changing coasting torque depending on the inclination of a slope and a vehicle for executing the same.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

In accordance with an exemplary embodiment of the present disclosure, a method of controlling a coasting torque using an electric motor for a vehicle having the electric motor includes: determining a speed range to travel on a forward slope based on the current vehicle speed; determining a target speed within the speed range based on a coasting torque and a travel load depending on vehicle speed; and correcting a driving force of the electric motor in response to the determined target speed.

In accordance with another exemplary embodiment of the present disclosure, a vehicle for executing the coasting torque control method includes: a driving motor configured to output coasting torque when a driver does not accelerate or decelerate the vehicle; a first controller configured to determine a speed range to travel on a forward slope based on the current vehicle speed, determine a target speed within the speed range based on coasting torque and travel load depending on vehicle speed, and correct the driving force of the driving motor in response to the determined target speed; and a second controller configured to control the driving motor in response to a torque command from the first controller.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
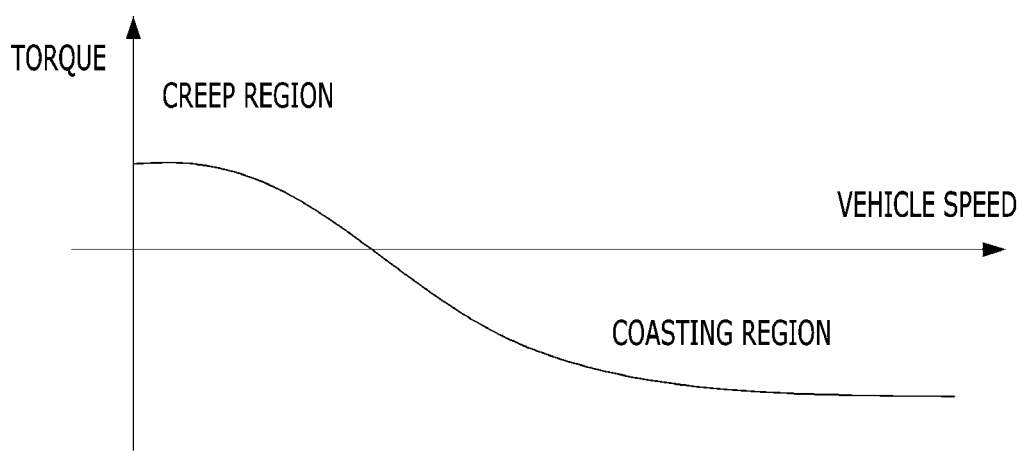
FIG. 1 is a view showing an example of a relationship between coasting torque and a vehicle speed while a general vehicle is coasting.
Figure 2:
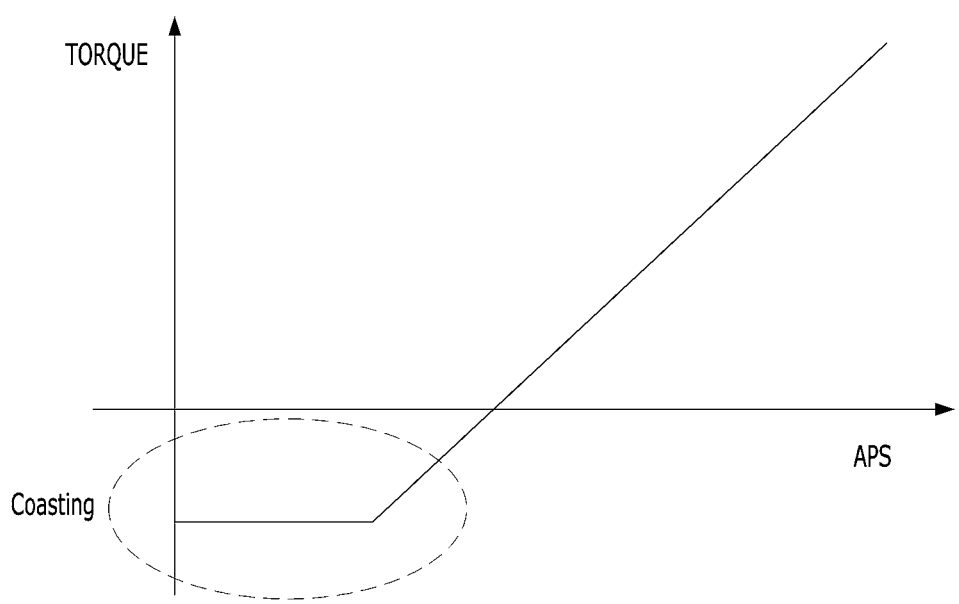
FIG. 2 is a view showing a relationship between an accelerator pedal and torque in a general vehicle equipped with an electric motor.
Figure 3:
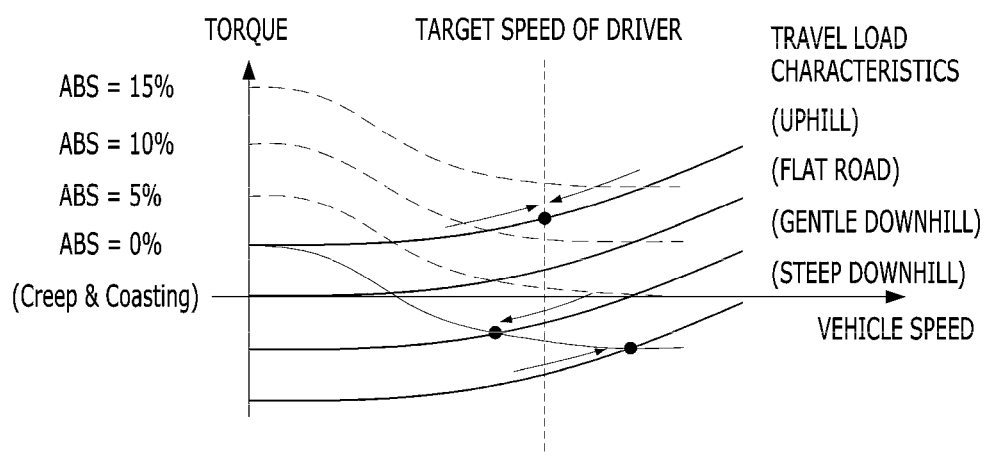
FIG. 3 is a view showing effects according to general adjustment of responsiveness to an accelerator pedal depending on an inclination of a road.

Hereinafter, exemplary embodiments of the present disclosure will be described in detail with reference to the accompanying drawings so as for those skilled in the art to easily carry out the embodiments. The present disclosure may, however, be embodied in many different forms, and should not be construed as being limited to the embodiments set forth herein. In the drawings, parts irrelevant to the description of the present disclosure will be omitted for clarity. Like reference numerals refer to like elements throughout the specification.

Throughout the specification, unless explicitly described to the contrary, the word "include" and variations such as "includes" or "including" will be understood to imply the inclusion of stated elements but not the exclusion of any other elements. In addition, the same reference numerals used throughout the specification refer to the same constituent elements.

When the vehicle speed deviates from an expected value (i.e. a target speed), rather than immediately after entering a slope, most drivers tend to operate the accelerator pedal or the brake pedal in order to maintain the target speed. This will be described below with reference to FIG. 4.

Figure 4:
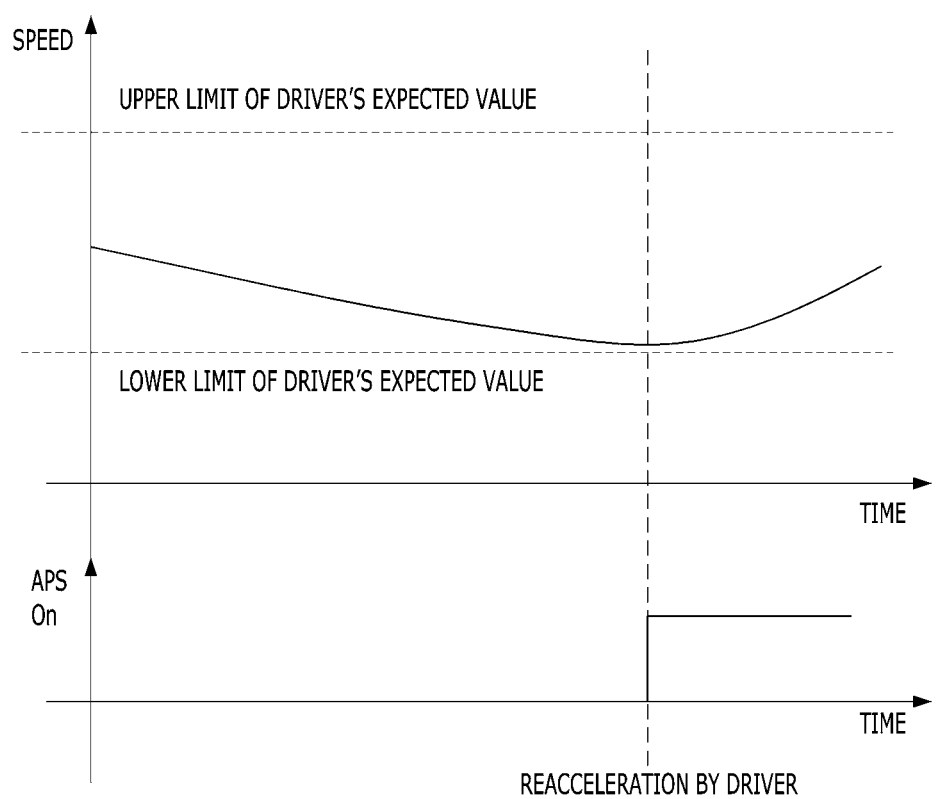
FIG. 4 is a view showing a general driver's tendency to adjust a vehicle speed.

FIG. 4 is a view showing a general driver's tendency to adjust a vehicle speed.

Referring to FIG. 4, when a driver intends to drive at a constant speed, if a vehicle speed deviates from an expected target speed, the driver generally takes measures when a certain expected value range is exceeded, rather than immediately taking measures. For example, as shown in FIG. 4, when the vehicle speed is reduced to the lower limit of the driver's expected value, the driver operates the accelerator pedal.

If the accelerator pedal is not depressed during downhill travel, the operation shown in FIG. 4 is performed, which may incur deterioration in energy efficiency due to a change in speed. Specifically, if the vehicle speed is reduced by coasting torque during gentle downhill travel, kinetic energy is stored in the battery. However, if the vehicle speed is reduced to the lower limit of the driver's expected value and thus the driver operates the accelerator pedal to accelerate the vehicle, loss occurs due to energy conversion. Unlike this, during steep downhill travel, the vehicle speed increases. If the vehicle speed reaches the upper limit of the driver's expected value, the driver operates the brake pedal, and thus hydraulic braking force is generated, leading to deterioration in regenerative braking efficiency.

Therefore, it is advantageous to reduce the coasting torque during gentle downhill travel, and it is advantageous to increase the coasting torque during steep downhill travel in order to prevent it from being necessary to operate the brake pedal.

Therefore, the present disclosure proposes a control method for determining efficient coasting torque. According to the present disclosure, when the driver of a vehicle equipped with an electric motor intends to drive the vehicle at a constant speed, a target speed is set through the determination of the traveling conditions of the vehicle, and the coasting torque is controlled so that the vehicle speed approaches the set target speed.

The construction of a vehicle and a driving control method for the same according to an exemplary embodiment of the present disclosure will be described below with reference to FIGS. 5 and 6.

Figure 5:
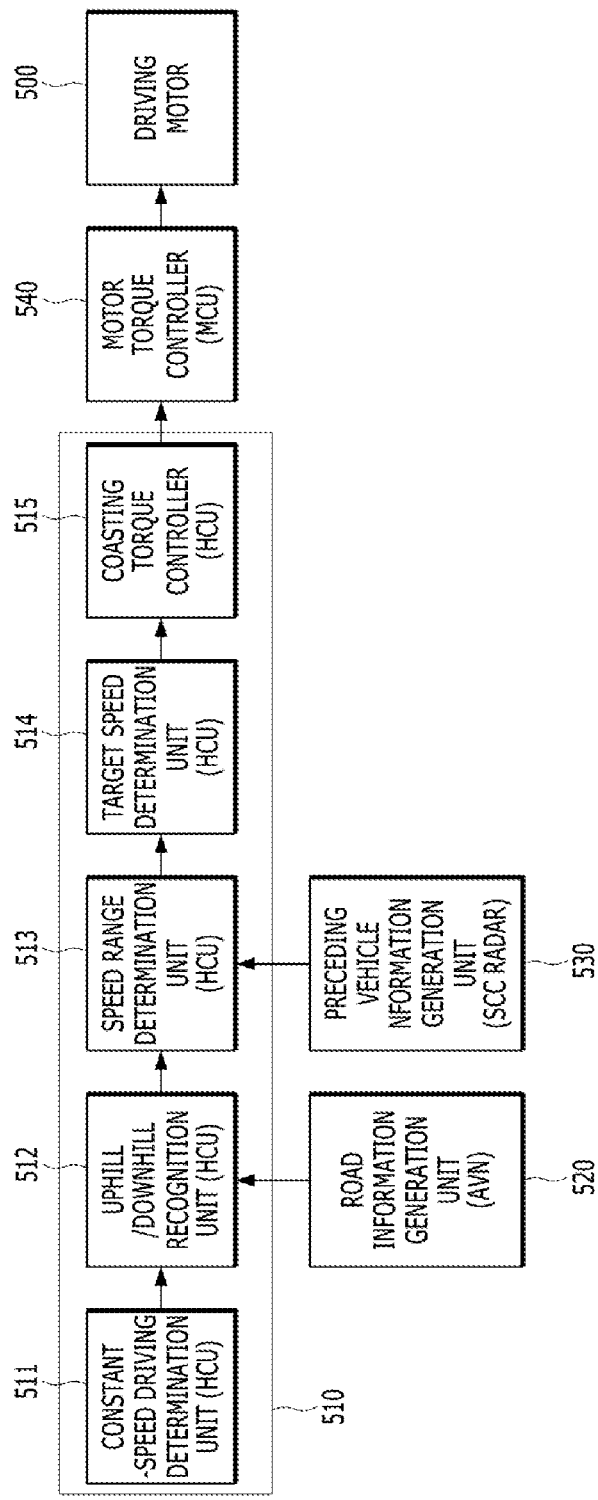
FIG. 5 is a block diagram showing an example of a construction of a vehicle according to an exemplary embodiment of the present disclosure.
Figure 6:
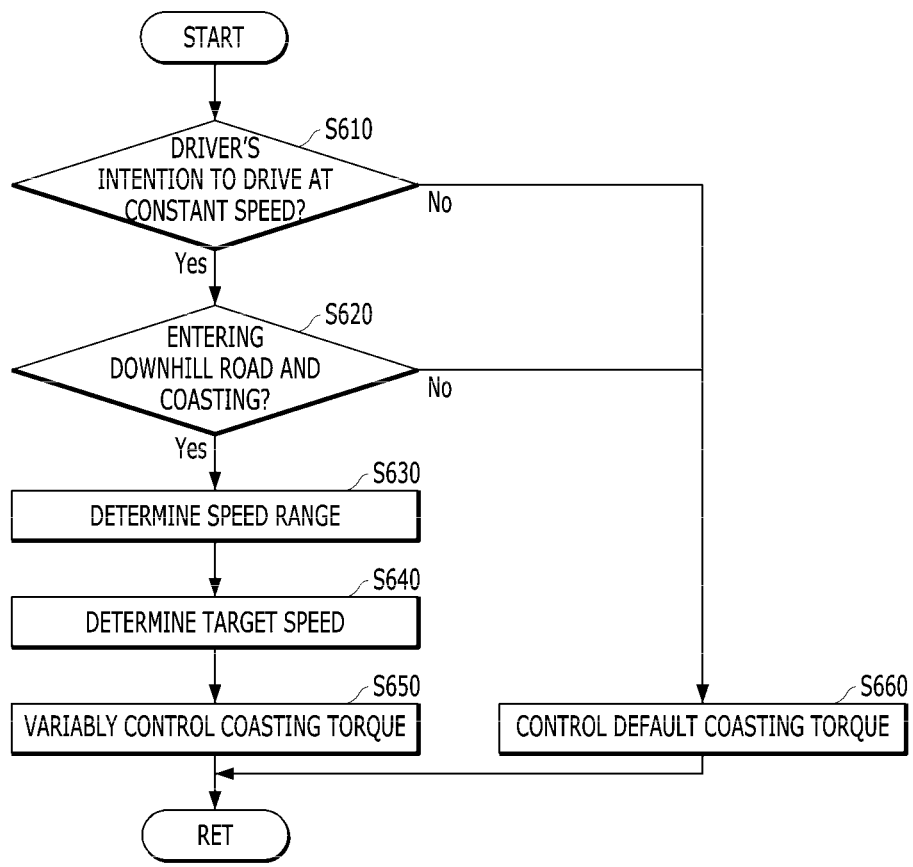
FIG. 6 is a flowchart showing an example of a driving control process for setting coasting torque according to an exemplary embodiment of the present disclosure.

FIG. 5 is a block diagram showing an example of the construction of a vehicle according to an exemplary embodiment of the present disclosure, and FIG. 6 is a flowchart showing an example of a driving control process for setting coasting torque according to an exemplary embodiment of the present disclosure.

Referring to FIG. 5, the vehicle according to an exemplary embodiment of the present disclosure may include a hybrid control unit (HCU) 510, a road information generation unit 520, a preceding vehicle information generation unit 530, a motor torque controller 540, and a driving motor 550.

Here, when the vehicle is an electric vehicle (EV), the HCU 510 may be substituted with a vehicle control unit (VCU). However, this is merely illustrative. The HCU is not limited to any specific definition, so long as the HCU serves as a higher-level controller of the motor torque controller 540 for controlling the driving motor 550 and determines coasting torque. The HCU 510 may include a constant-speed driving determination unit 511, an uphill/downhill recognition unit 512, a speed range determination unit 513, a target speed determination unit 514, and a coasting torque controller 515. These respective constituent components may be implemented as individual processing modules within the HCU 510, or may be implemented in the form of one or more commands or programs, which are executed by the processor of the HCU. The concrete functions of the above constituent components will be described below in more detail with reference to FIG. 6 and the other accompanying drawings.

The road information generation unit 520 may be implemented as an audio/video/navigation (AVN) system and may obtain information about the length of a forward slope section and the inclination thereof using map data such as a detailed map. The road information generation unit 520 may be configured to obtain road information from nearby vehicles or an infrastructure via vehicle-to-everything (V2X) communication, instead of the AVN system or together with the AVN system.

The preceding vehicle information generation unit 530 may obtain the locations, speeds and the like of nearby vehicles using the radar of a smart cruise control (SCC) system. However, this is merely illustrative. A vision camera, an advanced driver assistance system (ADAS) or any other device may be used, so long as it is capable of obtaining the locations, speeds and the like of the nearby vehicles.

The motor torque controller 540 may be implemented as a motor control unit (MCU). The motor torque controller 540 may receive a torque command, which corresponds to the coasting torque determined by the HCU 510, from the HCU 510, and may control the coasting torque of the driving motor 550 in response to the received torque command.

The above-described components of the vehicle are components necessary for control of the coasting torque of the electric motor. An actual vehicle may include a greater or smaller number of components than those described above as needed.

Referring to FIG. 6, the constant-speed driving determination unit 511 may determine whether the driver intends to drive the vehicle at a constant speed (S610). The driver's intention to drive at a constant speed may be determined based on at least one of information inside the vehicle or information outside the vehicle. For example, the constant-speed driving determination unit 511 may determine whether the driver intends to drive the vehicle at a constant speed based on at least one of a road condition, a degree of congestion, a remaining distance to a location where acceleration/deceleration is required, or a speed distribution during a predetermined recent time period. In greater detail, when the road type is an expressway or a national highway, the possibility of realizing constant-speed driving is higher than in a downtown area. As the degree of congestion is lower, deceleration is required less. Further, when the remaining distance to the location where acceleration/deceleration is required (e.g. an intersection, a ramp, a junction, an interchange, a tollgate, a speed camera, etc.), which is obtained through the navigation system or the like, is equal to or greater than a predetermined distance, there is little likelihood of changing the speed. In addition, when the dispersion or the standard deviation of the speed distribution during a predetermined recent time period falls within a predetermined range, it may be determined that constant-speed driving is being realized.

Two or more of the above-described determination criteria may be combined to determine the intention to drive at a constant speed, and different weighted values may be assigned to the respective determination criteria.

When it is determined that the driver has the intention to drive at a constant speed (yes at S610), the uphill/downhill recognition unit 512 may obtain information about a forward slope section, e.g. the presence or absence thereof, the inclination thereof (e.g. the average inclination of the slope section), the length thereof, and the like, and may determine whether the vehicle is coasting when entering the forward uphill/downhill road based on the obtained information (S620). Here, the uphill/downhill recognition unit 512 may determine that the vehicle is coasting when both the APS value and the BPS value are off.

When it is determined that the vehicle is coasting when entering the uphill/downhill road, the speed range determination unit 513 may first determine a speed range in order to determine a target speed (S630). Here, the speed range may be a range of the vehicle speed that is allowed while coasting, which is determined considering the conditions of the peripheral environment, and the target speed may be determined within this speed range.

Figure 7:
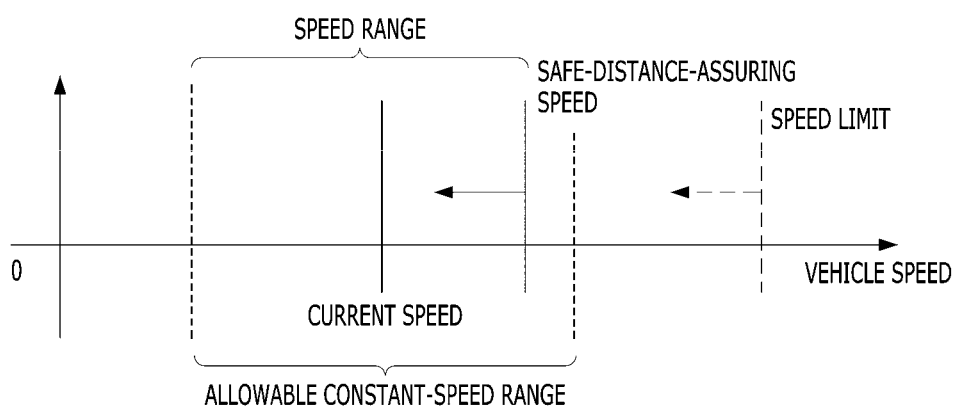
FIG. 7 is a view showing a concept of a speed range according to an exemplary embodiment of the present disclosure.
Figure 8:
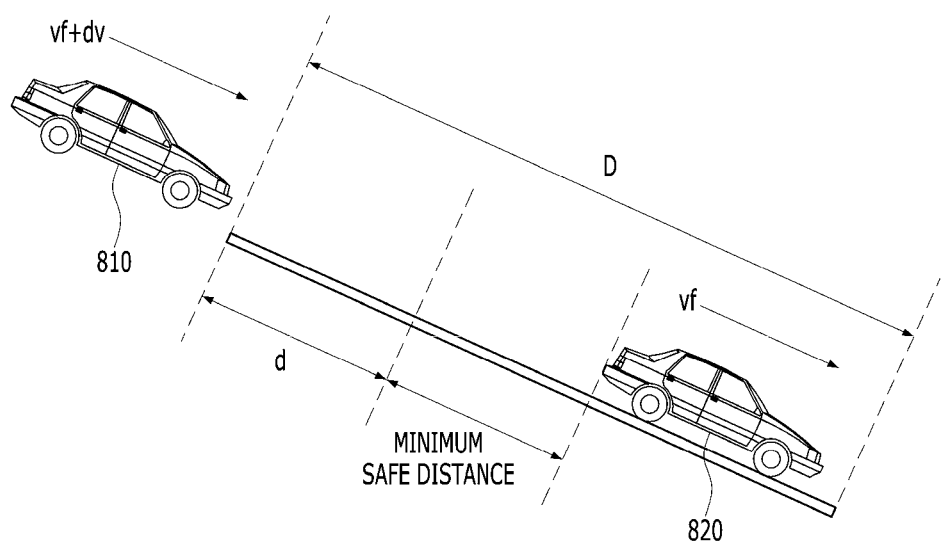
FIG. 8 is a view showing a concept of a vehicle speed for assuring a safe distance according to an exemplary embodiment of the present disclosure.

A method of determining the speed range will be described below with reference to FIGS. 7 and 8. FIG. 7 is a view showing the concept of the speed range according to an exemplary embodiment of the present disclosure, and FIG. 8 is a view showing the concept of a vehicle speed for assuring a safe distance according to an exemplary embodiment of the present disclosure.

Referring to FIG. 7, a speed range may be determined based on three speed components, including an allowable constant-speed range, a speed limit, and a threshold speed for assuring a minimum safe distance to a preceding vehicle during downhill travel (hereinafter referred to as a "safe-distance-assuring speed" for convenience). The allowable constant-speed range may be set by applying a predetermined speed margin to the current speed so as to have a lower limit value below the current speed and an upper-limit value above the current speed. Here, the predetermined speed margin may be set based on the dispersion or the standard deviation of the speed distribution during a predetermined recent time period. That is, as variation in the speed input by the driver increases during constant-speed travel, the allowable constant-speed range for downhill travel may be set more widely.

The speed range needs to fall within the allowable constant-speed range, and also needs to be less than the current road speed limit and less than the safe-distance-assuring speed. For example, as shown in FIG. 7, the allowable constant-speed range is determined based on the current speed, and all values within the allowable constant-speed range are less than the speed limit, but some values within the same are greater than the safe-distance-assuring speed. Thus, the finally determined speed range is set such that the maximum speed in the allowable constant-speed range is limited to be less than the safe-distance-assuring speed.

Next, the safe-distance-assuring speed will be described with reference to FIG. 8. FIG. 8 shows the situation in which a host vehicle 810 travels on a downhill road and a preceding vehicle 820 is present ahead of the host vehicle 810. When the speed of the preceding vehicle 820 is vf, the relative speed between the host vehicle 810 and the preceding vehicle 820 is dv, the distance to the minimum safe distance is d, and the distance of the downhill travel section is D, it is required to satisfy the following condition: "time taken to reach minimum safe distance>=downhill travel time", and it is therefore required to satisfy the following equation: "d/dv>=D/(vf+dv)". When "dv" satisfying this equation is referred to as "dv*", the safe-distance-assuring speed may be obtained by "vf+dv*". Here, the minimum safe distance may be a preset value or may be variably set depending on at least one of the braking performance of the host vehicle, the inclination of the slope, or the driver's tendency to operate the brake pedal.

Figure 9:
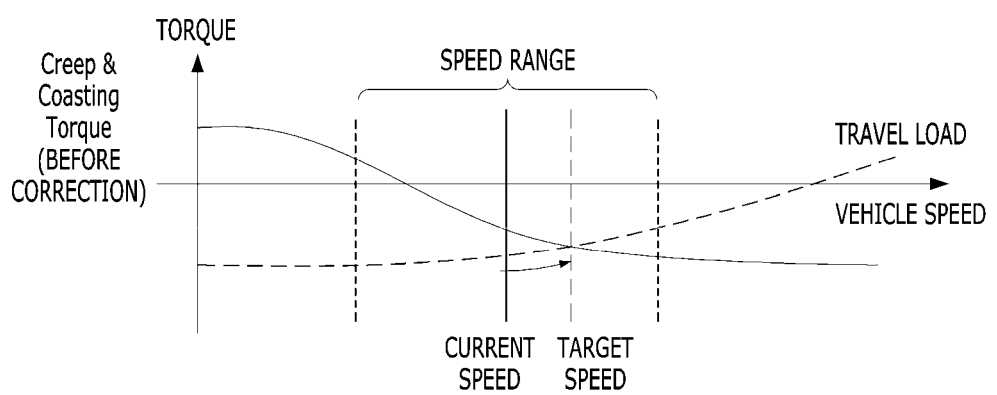
FIG. 9 shows a method of determining a target speed when an equilibrium point at which a current travel load and a coasting torque meet is located within a speed range according to an exemplary embodiment of the present disclosure.

Referring back to FIG. 6, when the speed range is determined, the target speed determination unit 514 may determine a target speed within the determined speed range (S640). At this time, the target speed determination unit 514 may determine the target speed in a manner of minimizing driver discomfort. The determination of the target speed may be classified into three cases depending on whether the equilibrium point at which a current travel load and a coasting torque meet is located within the speed range. This will be described below with reference to FIGS. 9 to 11. FIG. 9 shows a method of determining the target speed when the equilibrium point at which the current travel load and the coasting torque meet is located within the speed range according to this embodiment, FIG. 10 shows a method of determining the target speed when the current travel load is less than the coasting torque and when the equilibrium point is located out of the speed range according to this embodiment, and FIG. 11 shows a method of determining the target speed when the current travel load is greater than the coasting torque and when the equilibrium point is located out of the speed range according to this embodiment.

Figure 10:
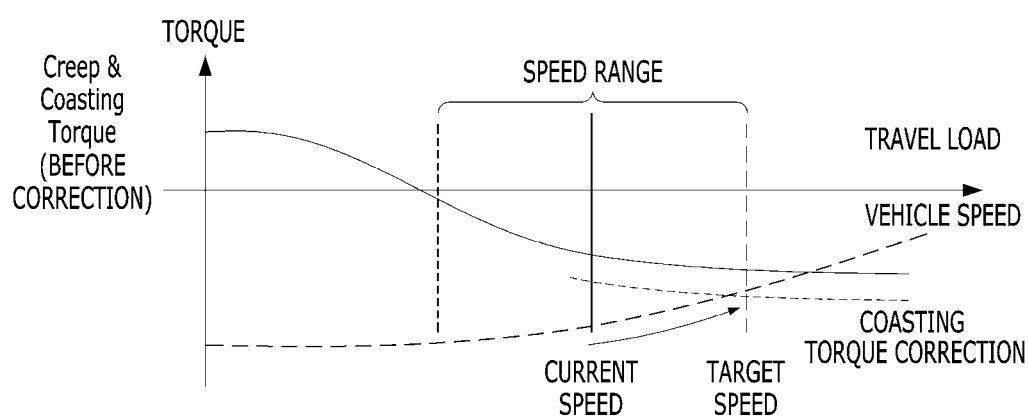
FIG. 10 shows a method of determining a target speed when a current travel load is less than a coasting torque and when an equilibrium point is located out of a speed range according to an exemplary embodiment of the present disclosure.
Figure 11:
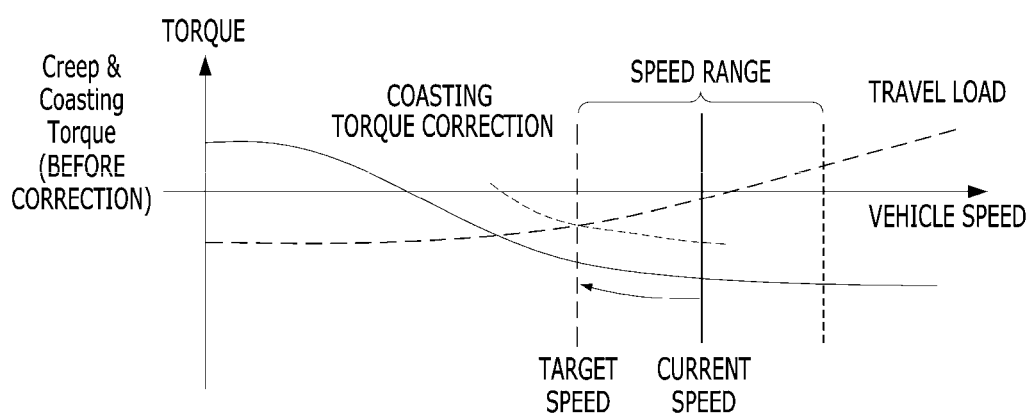
FIG. 11 shows a method of determining a target speed when the current travel load is greater than a coasting torque and when an equilibrium point is located out of a speed range according to an exemplary embodiment of the present disclosure.

In each of FIGS. 9 to 11, the horizontal axis represents the vehicle speed, the vertical axis represents the torque, and the term "Before Correction" refers to operation in which the creep torque or the coasting torque at each vehicle speed has a default setting value.

As shown in FIG. 9, when the equilibrium point at which the current travel load and the coasting torque meet is located within the speed range, the target speed may be determined as a speed corresponding to the equilibrium point.

As shown in FIG. 10, when the current travel load is less than the coasting torque and when the equilibrium point is located out of the speed range, the target speed may be determined as an upper-limit speed of the speed range. At this time, the coasting torque controller 515, which will be described later, may perform correction in a manner of increasing the coasting torque in order to satisfy the determined target speed (i.e. so that the equilibrium point is formed at the target speed).

As shown in FIG. 11, when the current travel load is greater than the coasting torque and when the equilibrium point is located out of the speed range, the target speed may be determined as a lower limit speed of the speed range. At this time, the coasting torque controller 515, which will be described later, may perform correction in a manner of reducing the coasting torque in order to satisfy the determined target speed.

The current travel load may be calculated as follows:

$$RoadLoad(v,\theta) = \tfrac{1}{2} \cdot Cd \cdot \rho \cdot A \cdot v^2 + m \cdot g \cdot \sin\theta + m \cdot b \cdot \text{sign}(v)$$

The above factors have the following meanings.

Cd: air resistance coefficient, ρ: density of air, A: full projected area of vehicle, v: vehicle speed, m: mass of vehicle, g: acceleration of gravity, θ: inclination (i.e. average inclination of slope section), and b: rolling resistance Referring back to FIG. 6, when the target speed is determined, the coasting torque controller 515 may variably control the coasting torque as needed (S650). For example, in the case of FIG. 9, the coasting torque may be maintained in an existing control method in which the coasting torque is controlled in response to the speed. In the case of FIG. 10, the coasting torque may be controlled so as to be corrected in a manner of being increased. In the case of FIG. 11, the coasting torque may be controlled so as to be corrected in a manner of being decreased. At this time, it is desirable to correct the coasting torque such that the vehicle speed approaches the target speed during the uphill/downhill travel time period and such that the change in speed is minimized in order to minimize driver discomfort. To this end, target acceleration may be first set. Thereafter, a reference speed may be generated using the current speed and the target acceleration, and feedforward control and feedback control may be performed together. This will be described below with reference to FIGS. 12 and 13.

Figure 12:
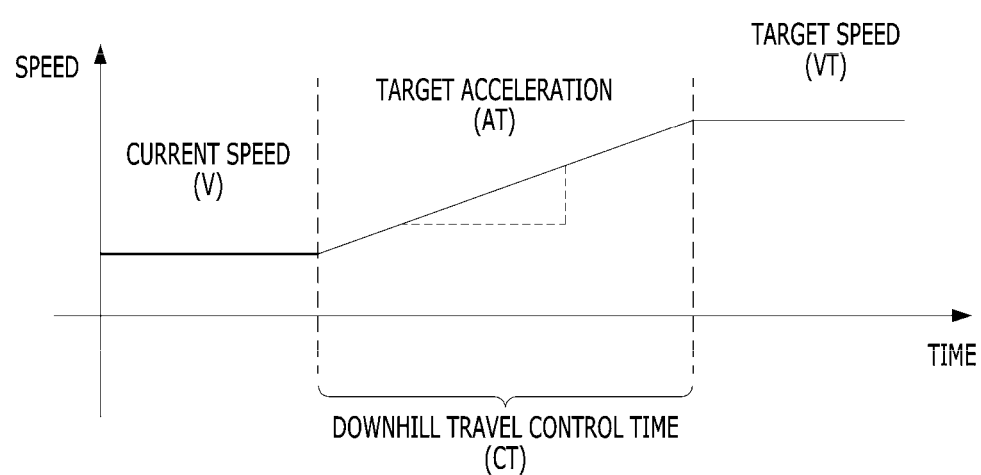
FIG. 12 is a view showing a setting of target acceleration according to an exemplary embodiment of the present disclosure.
Figure 13:
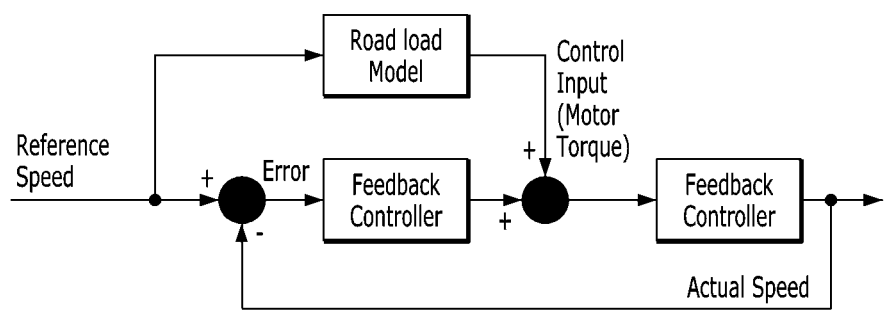
FIG. 13 is a view showing a process of controlling a vehicle speed using a reference speed based on a setting of a target acceleration according to an exemplary embodiment of the present disclosure.

FIG. 12 is a view showing setting of the target acceleration according to an exemplary embodiment of the present disclosure, and FIG. 13 is a view showing a process of controlling the vehicle speed using the reference speed based on the setting of the target acceleration according to an exemplary embodiment of the present disclosure.

Referring to FIG. 12, the target acceleration AT may be obtained using the downhill travel control time CT, which is taken for the current speed V to reach the target speed VT. Specifically, the target acceleration AT may be calculated as follows: "(VT−V)/CT". The downhill travel control time CT may be calculated as follows: "D/{(V+VT)/2}". That is, the downhill travel control time CT may be a value obtained by dividing the downhill travel distance (the total length of the slope section) by the average speed.

After the target acceleration is obtained by the method shown in FIG. 12, a reference speed may be generated using the current speed. Subsequently, as shown in FIG. 13, feedback control and feedforward control may be performed together, whereby actual speed control may be performed. Specifically, the reference speed is input to a travel load model and serves as a control input pertaining to the motor torque as a feedforward element, and the actual speed according to the control result may be input as a feedback element.

In addition, the final coasting torque, determined by the coasting torque controller 515, may be transmitted to the motor torque controller 540 in a torque command form. The motor torque controller 540 may generate three-phase current corresponding to the torque command and may apply the three-phase current to the driving motor 550, thereby controlling the torque of the driving motor 550.

On the other hand, when it is determined that the driver does not have the intention to drive at a constant speed, that the vehicle runs on a flat road, or that the accelerator pedal or the brake pedal is being operated, coasting torque control may be performed according to a default setting method based on the vehicle speed (S660).

According to the embodiments described above, a vehicle is capable of automatically determining the driver's intention to drive at a constant speed and controlling coasting torque within a range that minimizes driver discomfort, thereby improving drivability. In addition, since the vehicle speed is maintained without operation of the accelerator pedal or the brake pedal during uphill/downhill travel, it is possible to prevent energy loss due to a speed reduction or reacceleration during gentle downhill travel and to prevent deterioration in regenerative braking efficiency due to a braking operation during steep downhill travel.

The present disclosure described above may be implemented as a computer-readable code of a computer-readable medium in which programs are recorded. The computer-readable medium includes all kinds of recording devices in which data that may be read by a computer system is stored. Examples of the computer-readable medium may include a hard disk drive (HDD), a solid-state disk (SSD), a silicon disk drive (SDD), ROM, RAM, a CD-ROM, a magnetic tape, a floppy disk, and an optical data storage device.

As is apparent from the above description, according to the vehicle related to at least one embodiment of the present disclosure constructed as described above, it is possible to more efficiently set coasting torque.

In particular, the vehicle according to the present disclosure is capable of setting coasting torque more efficiently depending on the driving conditions using traffic information, slope information, radar information, etc., thereby preventing energy consumption due to unnecessary reacceleration and increasing the regenerative braking amount in a situation in which deceleration is required.

It will be appreciated by those skilled in the art that the effects achievable through the present disclosure are not limited to those that have been specifically described hereinabove, and other effects of the present disclosure will be more clearly understood from the detailed description above.

Accordingly, the detailed description above is not intended to be construed to limit the present disclosure in all aspects, but is to be considered by way of example. The scope of the present disclosure should be determined by reasonable interpretation of the accompanying claims, and all equivalent modifications made without departing from the scope of the present disclosure should be included in the following claims.

What is claimed is:

1. A method of controlling a coasting torque using an electric motor for a vehicle having the electric motor, the method comprising:
   determining a speed range to travel on a forward slope based on a current vehicle speed;
   determining a target speed within the speed range based on the coasting torque and a travel load depending on vehicle speed; and
   correcting a driving force of the electric motor in response to the determined target speed.

2. The method according to claim 1, further comprising:
   determining whether a driver has an intention to drive at a constant speed; and
   upon determining that the driver has the intention to drive at the constant speed, acquiring information about the forward slope.

3. The method according to claim 2, wherein the intention to drive at the constant speed is determined based on at least one of variation in vehicle speed or road information obtained during a predetermined time period before a current time point.

4. The method according to claim 2, wherein the information about the forward slope comprises a length of the forward slope and an average inclination of the forward slope obtained based on map information.

5. The method according to claim 1, wherein the determining the speed range is performed based on the current vehicle speed and at least one of dispersion of vehicle speed measured during a predetermined time period before a current time point, a road speed limit, or a safe distance to a preceding vehicle.

6. The method according to claim 1, wherein the determining the target speed is performed based on determination as to whether an equilibrium point, at which the coasting torque and the travel load are equal to each other and vehicle speed is maintained, is located within the speed range.

7. The method according to claim 6, wherein, when the equilibrium point is located within the speed range,
   the determining the target speed comprises determining vehicle speed corresponding to the equilibrium point as the target speed.

8. The method according to claim 6, wherein, when the equilibrium point is located out of the speed range,
   the determining the target speed comprises determining one of an upper-limit speed and a lower-limit speed in the speed range, which is closer to the equilibrium point, as the target speed.

9. The method according to claim 1, wherein the correcting is performed to cause vehicle speed at a point at which the forward slope ends to approach the target speed.

10. A non-transitory computer-readable recording medium having recorded therein a program for causing a computer to execute the method of controlling the coasting torque described in claim 1.

11. A vehicle comprising:
a driving motor configured to output a coasting torque when a driver does not accelerate or decelerate the vehicle;
a first controller configured to:
   determine a speed range to travel on a forward slope based on a current vehicle speed,
   determine a target speed within the speed range based on the coasting torque and a travel load depending on vehicle speed, and
   correct a driving force of the driving motor in response to the determined target speed; and
a second controller configured to control the driving motor in response to a torque command from the first controller.

12. The vehicle according to claim 11, wherein the first controller determines whether the driver has an intention to drive at a constant speed, and
wherein, upon determining that the driver has the intention to drive at the constant speed, the first controller acquires information about the forward slope.

13. The vehicle according to claim 12, wherein the intention to drive at the constant speed is determined based on at least one of variation in vehicle speed or road information obtained during a predetermined time period before a current time point.

14. The vehicle according to claim 12, wherein the information about the forward slope comprises a length of the forward slope and an average inclination of the forward slope obtained based on map information.

15. The vehicle according to claim 11, wherein the first controller determines the speed range based on the current vehicle speed and at least one of dispersion of vehicle speed measured during a predetermined time period before a current time point, a road speed limit, or a safe distance to a preceding vehicle.

16. The vehicle according to claim 11, wherein the first controller determines the target speed based on determination as to whether an equilibrium point, at which the coasting torque and the travel load are equal to each other and vehicle speed is maintained, is located within the speed range.

17. The vehicle according to claim 16, wherein, when the equilibrium point is located within the speed range,
the first controller determines vehicle speed corresponding to the equilibrium point as the target speed.

18. The vehicle according to claim 16, wherein, when the equilibrium point is located out of the speed range,
the first controller determines one of an upper-limit speed and a lower-limit speed in the speed range, which is closer to the equilibrium point, as the target speed.

19. The vehicle according to claim 11, wherein the first controller corrects the driving force to cause vehicle speed at a point at which the forward slope ends to approach the target speed.

* * * * *